United States Patent
Deuskar et al.

(10) Patent No.: US 11,972,476 B2
(45) Date of Patent: *Apr. 30, 2024

(54) SYSTEMS AND METHODS FOR DYNAMIC SITE GENERATION WITH EVOLVING CRITERIA AND CONTENT ADJACENCY

(71) Applicant: Stylitics, Inc., New York, NY (US)

(72) Inventors: Rohan Deuskar, New York, NY (US); Jeremy Raines, Hayward, CA (US)

(73) Assignee: Stylitics, Inc., New York, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/537,055

(22) Filed: Nov. 29, 2021

(65) Prior Publication Data

US 2022/0122162 A1     Apr. 21, 2022

Related U.S. Application Data

(63) Continuation of application No. 17/071,401, filed on Oct. 15, 2020, now Pat. No. 11,188,976.

(51) Int. Cl.
| | |
|---|---|
| *G06Q 30/0601* | (2023.01) |
| *G06F 3/0481* | (2022.01) |
| *G06F 9/451* | (2018.01) |
| *G06F 16/958* | (2019.01) |

(52) U.S. Cl.
CPC ....... *G06Q 30/0643* (2013.01); *G06F 3/0481* (2013.01); *G06F 9/451* (2018.02); *G06F 16/958* (2019.01); *G06Q 30/0629* (2013.01); *G06Q 30/0631* (2013.01)

(58) Field of Classification Search
None
See application file for complete search history.

(56) References Cited

U.S. PATENT DOCUMENTS

| | | | |
|---|---|---|---|
| 10,706,450 B1 * | 7/2020 | Tavernier | G06F 16/9535 |
| 10,853,839 B1 | 12/2020 | Galep et al. | |
| 2016/0078517 A1 * | 3/2016 | Abe | G06F 16/2425 705/26.62 |
| 2016/0180389 A1 | 6/2016 | Kotas | |
| 2018/0218431 A1 * | 8/2018 | Prendki | G06Q 30/0631 |
| 2020/0134694 A1 | 4/2020 | Park et al. | |

* cited by examiner

*Primary Examiner* — Rinna Yi
(74) *Attorney, Agent, or Firm* — Ansari Katiraei LLP; Arman Katiraei; Sadiq Ansari (57) ABSTRACT

Provided is a system for dynamically generating a site with custom content using criteria that evolves based on properties of earlier selected content. The system may receive a request for a site, may define first criteria based on user preference and/or content priority specified for the site, and may populate a first customizable element of the site with first content that satisfies the first criteria. The system may determine a first set of properties of the first content that differ from the user preferences and the content priority, may define second criteria by modifying the first criteria with at least one new criterion that is derived from the first set of properties of the first content, and may populate a second customizable element of the site with different second content that satisfies the at least one new criterion from the second criteria.

18 Claims, 7 Drawing Sheets

SYSTEMS AND METHODS FOR DYNAMIC SITE GENERATION WITH EVOLVING CRITERIA AND CONTENT ADJACENCY

CLAIM OF BENEFIT TO RELATED APPLICATIONS

This application is a continuation of U.S. nonprovisional application Ser. No. 17/071,401 entitled "Systems and Methods for Dynamic Site Generation with Evolving Criteria and Content Adjacency", filed Oct. 15, 2020. The contents of application Ser. No. 17/071,401 are hereby incorporated by reference.

BACKGROUND

Online user experiences have shifted from static experiences to customized experiences. A static experience may be created by a host providing the same site and/or content to user equipment ("UEs") of different users despite the users having different preferences, demographics, and/or other differences. A customized experience may be created by the host varying the site and/or content that is provided to different users based on these differences, thereby providing content that is more relevant for each user.

DETAILED DESCRIPTION OF PREFERRED EMBODIMENTS

The following detailed description refers to the accompanying drawings. The same reference numbers in different drawings may identify the same or similar elements.

Systems and methods, in accordance with the embodiments set forth herein, may provide content adjacency for a dynamically generated site comprising a plurality of different content by using evolving selection criteria to select different custom content for the site and by evolving the selection criteria for subsequent content selection based on properties of earlier selected content. In particular, the systems and methods may select first customized content for a first customizable element of a site based on an initial set of criteria, and may customize content selection for other customizable elements of the site by modifying the set of criteria to account for the properties of the previously selected content. The dynamically generated site may include a site, application, and/or other presentation in which some or all of the content is customized. For instance, the dynamically generated site may include some static content and one or more dynamic widgets, components, and/or elements that contain the plurality of customized content selected using the evolving selection criteria.

By modifying the set of criteria based on the properties of the previously selected content, the systems and methods may provide a controlled selection of non-uniform content (e.g., content that satisfies different selection criteria) that is related to other custom content appearing on the site, and that differs from an uncontrolled or randomized selection of unrelated or random content. In summary, the systems and methods may provide a non-uniform customized user experience that preserves content adjacency by dynamically varying the criteria that is used to select custom content for each customizable element of a single site, rather than statically using the same custom criteria to select content for each and every element of that site.

Figure 1:
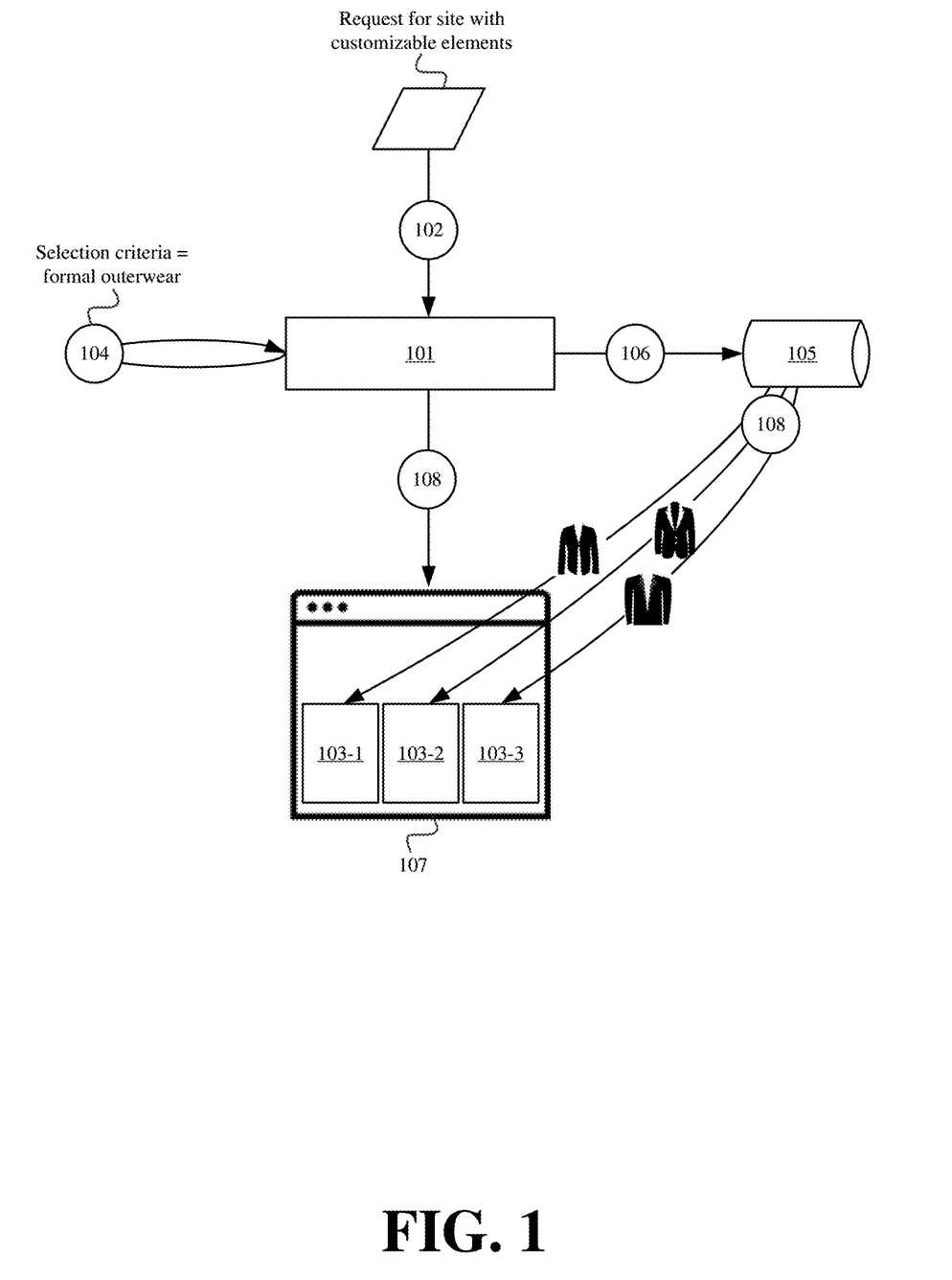
FIG. 1 illustrates an example of a site that results from using the same criteria to customize the content for the customizable elements of the site.

FIG. 1 illustrates an example of a site that results from using the same criteria to customize the content for the customizable elements of the site. As shown in FIG. 1, user equipment ("UE") associated with a particular user may issue (at 102) a request for a particular site over a data network such as the Internet. The particular site may correspond to a website, webpage, customized application, customized service, and/or other grouping of content that is presented collectively in one interface to the UE. The request may include a Uniform Resource Locator ("URL") that identifies the requested site, and may be issued as a HyperText Transfer Protocol ("HTTP") GET request or a request message of another application-layer protocol.

Content provider 101 may define (at 104) selection criteria for customizing the content of the requested site based on information that is available upon receiving the request. The content may include images, text, videos, interactive elements, advertisements, applications, services, tools, and/or other data that different users may access from the requested site. The selection criteria may be based on a profile that content provider 101 stores for the particular user. The profile may identify previous purchases, engagement, and/or other interests of the particular user. Additionally, or alternatively, the selection criteria may be based on tracked site engagement. For instance, the tracked site engagement may identify the most popular, new, and/or other content that receive the most user engagement. As shown in FIG. 1, the selection criteria may specify a preference or interest in formal outerwear.

Accordingly, content provider 101 may use the same selection criteria to populate customizable site elements 103-1, 103-2, and 103-3 with different articles of clothing and clothing accessories (e.g., content) that are classified as formal outerwear. More specifically, content provider 101 may scan a template of the requested site to determine customizable site elements 103-1, 103-2, 103-3 therein, and may query (at 106) content repository 105 for content that matches or satisfies the selection criteria. Content repository 105 may provide (at 108) and/or content provider 101 may populate (at 108) site 107 with three different but uniform articles of formal outerwear. Site 107 with the three articles of formal outwear may be provided to the requesting UE over the data network.

Although the content for site 107 is customized based on the selection criteria, site 107 may have a static presentation because all of the customized content conforms to one set of criteria (e.g., the selection criteria). Consequently, some of the content may be of interest to the particular user, but the remainder of the content may be less engaging because it offers the same uniform content. Another issue may be that the selection criteria is inaccurate, and may result in site 107 being populated with different content that satisfies the selection criteria but that is of no interest or relevance to the user. For instance, the selection criteria may be based on past purchase history of the user (e.g., user prefers formal outerwear). However, the user may have purchased all the formal outerwear that he or she needs, and therefore may be interested in other clothing. In this case, customizing the content of site 107 based on the same selection criteria produces a site that may have no relevant content for the user.

Figure 2:
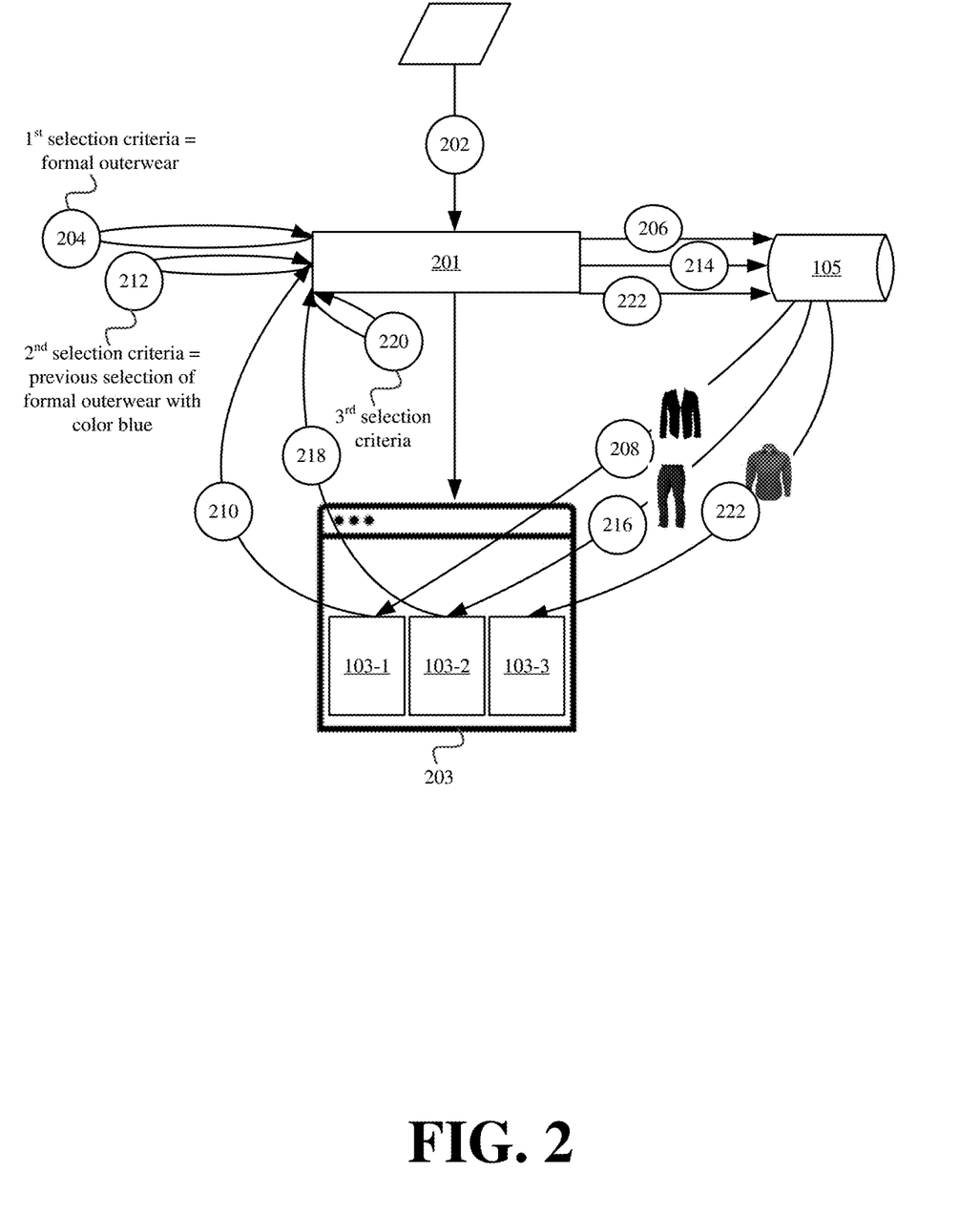
FIG. 2 illustrates an example for customizing the different content of a site using dynamic criteria that evolves and/or changes for content adjacency in accordance with some embodiments presented herein.

Some embodiments provide a content adjacency evolving ("CAE") system that customizes the content for different customizable elements (e.g., widgets and/or components) of a site using dynamic criteria that provides variety while ensuring content adjacency by evolving and/or changing with each selection based on properties of previously selected content. FIG. 2 illustrates an example for customizing the different content of a site using dynamic criteria that evolves and/or changes for content adjacency in accordance with some embodiments presented herein.

CAE system 201 may receive (at 202) a request for a particular site from a UE that is associated with a particular user. CAE system 201 may define (at 204) initial selection criteria from available information about the particular user and/or site. As noted above, the information about the particular user may include demographic information, user preferences, user purchase history, user location, UE type, and/or other profile or tracked information that is specific to the particular user or the UE of the particular user. The site information may include tracked site engagement that identifies the most popular, new, and/or other content that receive the most user engagement based on collective information that is acquired from prior access of the site by a plurality of users.

CAE system 201 may select first content for first customizable element 103-1 of the requested site using the initial selection criteria. For instance, CAE system 201 may query (at 206) content repository 105 for content that matches or satisfies the initial selection criteria, and content repository 105 may provide (at 208) and/or CAE system 201 may populate (at 208) dynamically generated site 203 with the first content at the location and/or position of first customizable element 103-1 at a first time.

CAE system 201 may determine (at 210) properties of the first content. The content properties may include visual and/or textual properties of the content. The visual properties may include coloring, objects or images appearing in the content, and/or data that corresponds to the coloring, objects, images, and/or other rendered characteristics that are descriptive of visual or rendered aspects of the content. The textual properties may include keywords, identifiers, and/or values that are descriptive of the content. The visual properties and/or textual properties may be determined (at 210) from analysis of the content and/or from metadata that is provided with the content. In some embodiments, CAE system 201 may analyze the content by rendering, parsing, and/or otherwise inspecting the content data.

CAE system 201 may define (at 212) second selection criteria, that is different than the initial selection criteria, based on the determined (at 210) properties of the first custom content and the initial selection criteria. In some embodiments, defining (at 212) the second selection criteria may include modifying the initial selection criteria based on the properties of the first custom content. In particular, CAE system 201 may modify the initial selection criteria to increase variety of the next content for a next element of site 203, to match a theme, style, and/or other properties of the first content, to provide differentiation from the first custom content, and/or to otherwise vary the initial selection criteria to prevent a static selection of content using the same criteria. The second selection criteria may therefore differ from the initial selection criteria, but may provide content adjacency relative to the first content by selecting second content that accounts for one or more properties of the first content or that has similarity to at least the one or more properties of the first content. For instance, CAE system 201 may modify the initial selection criteria to remove the "outerwear" criterion while preserving the "formal" criterion to provide variety in the presented custom content while preserving content adjacency between the already selected first content and the selection of the second content. CAE system 201 may also modify the initial selection criteria based on one or more properties of the first content to increase the content adjacency between the first custom content and the second content. For instance, CAE system 201 may determine a first color of the first content, and may add a second color, that complements but that is different than the first color, as new criterion for the second selection criteria. Similarly, CAE system 201 may determine a style property of the first content and/or properties of items that are commonly purchased with the first content, and add those properties as additional criteria of the second selection criteria.

CAE system 201 may query (at 214) content repository 105 using the second selection criteria, and content repository 105 may provide (at 216) and/or CAE system 201 may populate (at 216) dynamically generated site 203 with the second content, that matches and/or satisfies the second selection criteria, at the location and/or position of second customizable element 103-2 at a second time. In some embodiments, the second content may not match and/or satisfy the initial or first selection criteria because of the differences in the initial selection criteria used to select the first content and the second selection criteria used to select the second content, and/or because of the differences in the properties of the first content and the second content.

As shown in FIG. 2, the second selection criteria may be used to select a different article of clothing than the first content. The first content may include a formal coat or jacket that satisfies the formal outerwear initial selection criteria, and the second content may include formal pants that provide content adjacency by complementing or matching one or more properties of the first content included as part of the second selection criteria.

CAE system 201 may determine (at 218) one or more properties of the second content, and may continue to change (at 220) the selection criteria based on properties of all or each previously selected content when selecting subsequent content for subsequent elements of the site. For instance, the selection (at 222) of third content for third customizable element 103-3 may be based on the initial selection criteria, one or more properties of the first content, and/or one or more properties of the second custom content. Specifically, CAE system 201 may define (at 220) the third selection criteria to select a third article of clothing that complements the style, coloring, pattern, brand, and/or other properties of the first content and the content. Based on the third selection criteria, CAE system 201 may select and provide (at 222) a dress shirt that conforms to the "formal" criterion from the initial criteria and that conforms to and/or complements one or more properties of the previously selected formal jacket (e.g., first content) and formal pants (e.g., second content).

CAE system 201 may populate site 203 with the selected custom content. Populating the site may include incorporating links for the selected content into the site code, or may include incorporating the selected content directly within site 203. CAE system 201 may provide site 203 with the selected content to the requesting UE, and the UE may render and/or present site 203 on a display.

Figure 3:
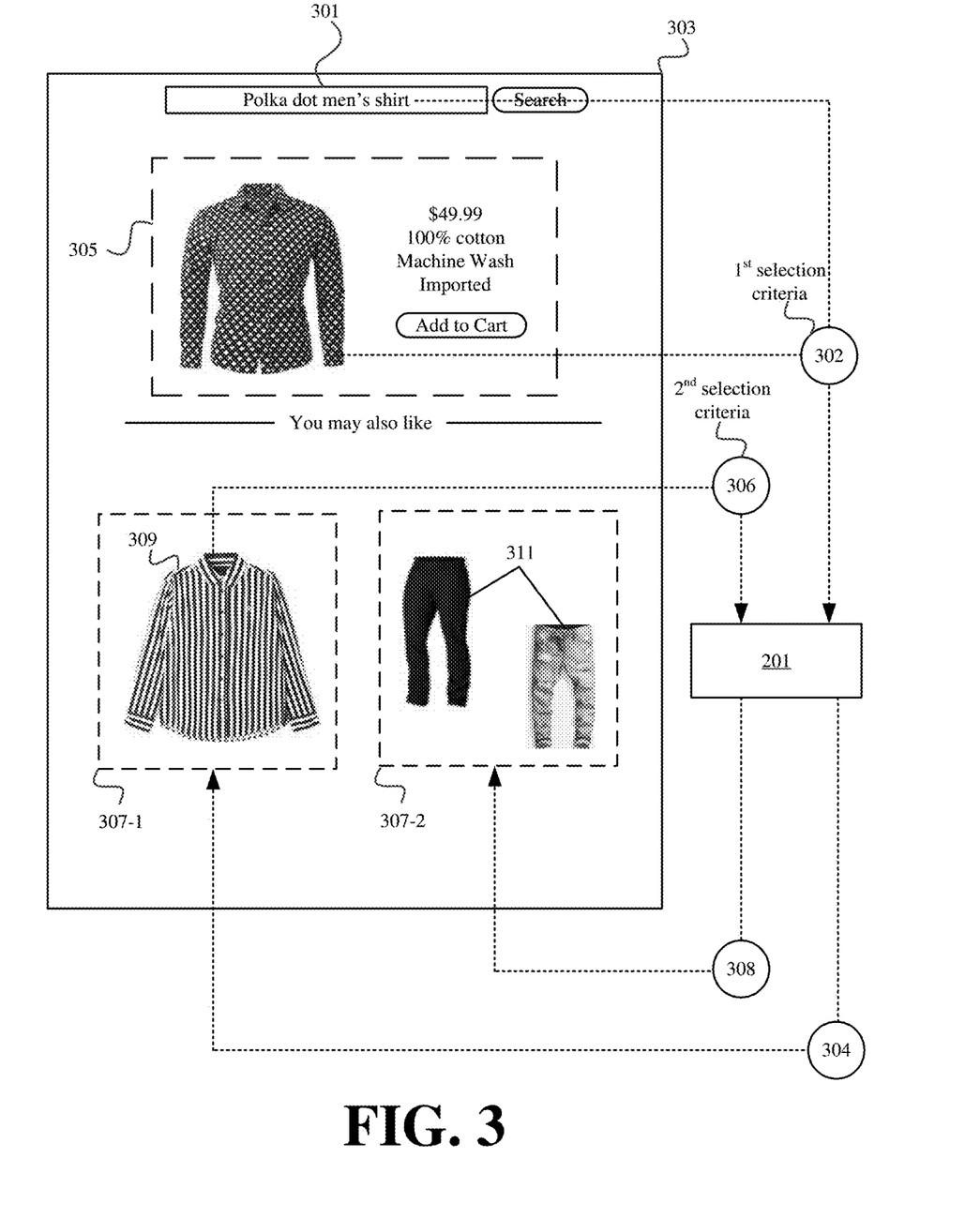
FIG. 3 illustrates an example for customizing the different content of a site using dynamic criteria that evolves from user input and properties of previously selected content in accordance with some embodiments presented here.

In some embodiments, the initial selection criteria may be defined based on user input and the second selection criteria may be defined based on properties of content selected in response to the user input. FIG. 3 illustrates an example for customizing the different content of a site using dynamic criteria that evolves from user input and properties of previously selected content in accordance with some embodiments presented here.

CAE system 201 may receive user input 301. User input 301 may include a search query for a particular item that is of interest to the user, or a selection of the particular item. CAE system 201 may update site 303 to include first content 305 that is responsive to the user input. For instance, CAE system 201 may provide information about the particular item.

CAE system 201 may determine (at 302) properties of first content 305. CAE system 201 and may define first selection criteria based on user input 301 and the properties of first content 305.

CAE system 201 may determine that site 303 includes two customizable elements 307-1 and 307-2. Accordingly, CAE system 201 may use the first selection criteria to select second content 309, and to populate (at 304) first customizable element 307-1 with second content 309. For instance, CAE system 201 may determine that user input 301 includes terms "polka dot" and "men's shirt", may determine that the terms correspond to a patterned style, may determine that first content 305 has black-and-white coloring, and may select second content 309 as a stripped (e.g., patterned) black-and-white shirt that matches the patterned style criterion determined from user input 301 and that matches the black-and-white coloring property of first content 305, that was not included with or specified as part of user input 301. Accordingly, CAE system 201 may populate (at 304) customizable element 307-1 with the black-and-white stripped shirt.

CAE system 201 may modify (at 306) the first selection criteria based on one or more properties of second content 309 that are not found in user input 301 or in properties of first content 305. For instance, second content 309 may include one or more properties that identify second content 309 as a different brand and price point than first content 305. Additionally, second content 309 may include one or more properties that identify a set of pants that are commonly purchased with the black-and-white stripped shirt. CAE system 201 may modify (at 306) the first selection criteria to provide second selection criteria that incorporates the set of pants, brand, and price point determined from the properties of second content 309, the black-and-white coloring determined from the properties of first content 305, and the patterned style determined from the properties of user input 301. In some embodiments, modifying (at 306) the first selection criteria may include removing previous criteria. For instance, CAE system 201 may define the second selection criteria to exclude the black-and-white coloring determined from the properties of first content 305 and/or the patterned style determined from user input 301.

CAE system 201 may use the second selection criteria to select third content 311 to present, and to populate (at 308) second customizable element 307-2 with third content 311. For instance, CAE system 201 may identify a subset of the set of pants that are commonly purchased with second content 309, that are of the same brand and price as second content 309, that complement and/or match the styling of the black-and-white coloring for first content 305, and that complement and/or match the patterned style from user input 301. CAE system 201 may present the subset of pants as third content 311.

Figure 4:
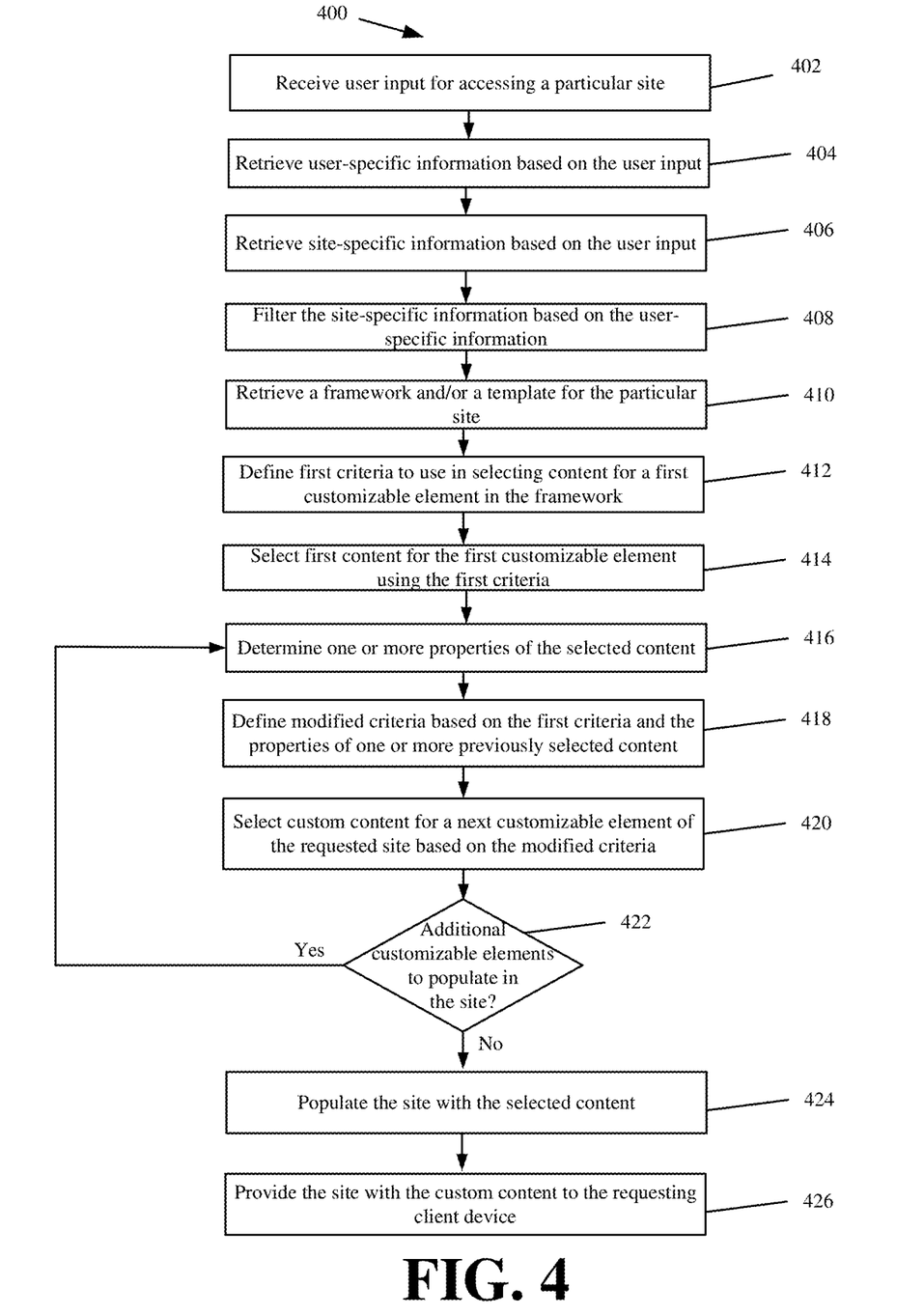
FIG. 4 presents a process for evolving the criteria that is used in customizing the different content presented as part of a single site in accordance with some embodiments presented herein.

FIG. 4 presents a process 400 for evolving the criteria that is used in customizing the different content presented as part of a single site in accordance with some embodiments presented herein. Process 400 may be implemented by CAE system 201.

Process 400 may include receiving (at 402) user input at CAE system 201. In some embodiments, the user input may include a request to access a particular site. For instance, the user input may include an HTTP GET request that is passed over a network and that includes a URL of the requested site. The user input may provide addressing of the UE issuing the user input, and the message header may include various identifying information about the UE or the user associated with the UE (e.g., user agent, browser version, a tracking token, etc.). In some embodiments, the user input may be issued after a request to access a particular site. In some such embodiments, the user input may include a search query, a selection made on the particular site, and/or input for other interactions the user may have with the particular site.

Process 400 may include retrieving (at 404) user-specific information based on the user input. The user-specific information may include previously tracked information about the user that may be retrieved (at 404) based on the user identifying information in the user input. For instance, CAE system 201 may use the addressing information and/or various header information to generate a unique signature for the requesting UE. CAE system 201 may use the unique signature to identify the user and/or to retrieve a profile that stores information about past purchases, preferences, demographics, and/or other user-specific information. In some embodiments, CAE system 201 may use the addressing information to determine a location of the requesting UE.

Process 400 may include retrieving (at 406) site-specific information and/or content priority information that is specified for the site based on the user input. For instance, CAE system 201 may perform a lookup to determine the most popular content (e.g., most purchased items), the most engaged with content (e.g., most viewed, most clicked-on, historical content performance, etc.), current content priorities (e.g., prioritize a first set of content for a first brand over a second set of content for a second brand), and/or other collective metrics for the content that is available at the requested site based on past user interactions with the site. The site-specific information may also include information about specific content that is selected and/or provided in response to the user input.

Process 400 may include filtering (at 408) the site-specific information based on the user-specific information. For instance, the site-specific information may indicate that the most purchased item is a particular casual shirt and the second most purchased item is a particular dress shirt. The user-specific information may specify that the requesting user has a preference for dress shirts. Accordingly, the filtering (at 408) may include retaining the site-specific information that matches the user-specific information (e.g., the particular dress shirt that is the second best-selling item), and/or discarding other site-specific information that does not match the user-specific information (e.g., the particular casual shirt that is best-selling item).

Process 400 may include retrieving (at 410) a framework and/or a template for the requested site. The framework and/or template may specify the formatting and layout for a plurality of customizable elements of the requested site without the actual content to present for each of the customizable elements. In some embodiments, the framework may include a HyperText Markup Language ("HTML") base page, Cascading Style Sheets ("CSS"), and/or other code that specifies the formatting and layout for the plurality of elements of the requested site. In some embodiments, the framework and/or template may define part of a page, application, and/or presentation. For instance, the framework and/or template may specify a customizable widget, gallery, window, and/or other component of the page, application, and/or presentation.

Each customizable element may correspond to an HTML element that is partially defined. For instance, each particular customizable element may specify sizing, resolution, location, acceptable content types, acceptable content formats, and/or other characteristics for the content that may be presented as part of that particular customizable element, but may omit the URL, link, content data, and/or other identifier for the content that is to be presented as part of that particular customizable element. The URL, link, content data, and/or other identifier for the content of a particular customizable element may be selected by CAE system 201 using the criteria that evolves based on the initial user request and/or user input, and properties of selected content for other customizable elements of the same site. Retrieving (at 410) the framework may include selecting a next customizable element that has yet to be populated with content.

Process 400 may include defining (at 412) first criteria to use in selecting content for a first customizable element of the site. CAE system 201 may define (at 412) the first criteria based on the filtered (at 408) site-specific information and/or user-specific information, and/or based on the user input. The definition (at 412) of the first criteria may vary depending on the availability and quantity of user-specific information, site-specific information, and/or user input. In some embodiments, CAE system 201 may be configured to prioritize various data of the user-specific information, site-specific information, and/or user input in defining (at 412) the first criteria. For instance, CAE system 201 may define (at 412) the first criteria to prioritize the most popular content for the location of the requesting user.

Process 400 may include selecting (at 414) first content for the first customizable element of the requested site using the first criteria. The first customizable element may be located anywhere in the requested site and need not correspond to the topmost or initial content of the requested content. The selection (at 414) of the first content may include searching content repository 105, that stores all available content for the requested site, and retrieving a subset of content with properties that satisfy and/or match the first criteria. CAE system 201 may then order or rank the subset of content based on other properties. For instance, ten shirts may match the first criteria, and CAE system 201 may select a particular shirt from the ten shirts as the first content based on the particular shirt receiving the most tracked engagement, having the most sales, being the newest of the shirts, and/or otherwise being determined to be the most engaging content for the user.

Process 400 may include determining (at 416) one or more properties of the selected content. The content properties may identify and/or describe features of the content. For instance, the content properties may identify an object, product, and/or good that is presented in an image. The content properties may identify other features such as the price, style, quantity, sizes, coloring, brand, and/or other characteristics of the object, product, and/or good.

In some embodiments, CAE system 201 may determine (at 416) the one or more properties from the metadata of the content. The metadata may provide tags or identifiers that identify or describe the content. CAE system 201 may temporarily store or associate the properties to the selected content.

In some embodiments, CAE system 201 may determine (at 416) the one or more properties from analyzing the content. Analyzing the content may include performing image matching in order to identify objects that appear in visual content (e.g., images, videos, or multimedia content). Analyzing the content may include extracting keywords or identifiers from textual content.

In any case, CAE system 201 may be configured to identify different properties of the selected content. In some embodiments, the identified properties may change depending on the content type. For instance, CAE system 201 may determine (at 416) a first set of properties for content that is representative of a first article of clothing (e.g., jackets), and may determine (at 416) a different second set of properties for content that is representative of a second article of clothing (e.g., pants) or a clothing accessory (e.g., belts).

Process 400 may include defining (at 418) modified criteria based on the first criteria and the properties of one or more previously selected content (e.g., properties of the first content). Defining (at 418) the modified criteria may include modifying the last criteria that was used to select content by adding new criteria and/or replacing existing criteria used to select content for a next customizable element in the site.

In some embodiments, defining (at 418) the modified criteria may include changing the criteria for variety without losing content adjacency. Content adjacency may include retaining commonality in a first set of properties of adjacent content while allowing for variety in a different second set of properties. Accordingly, CAE system 201 may determine one or more properties of the last selected content that are not included as part of the current selection criteria. For instance, CAE system 201 may determine that the last selected content has a particular price point, coloring, styling, pattern, fit, brand name, and/or other properties that are different than properties of other previously selected content and/or the current criteria. CAE system 201 may then add the different properties to the modified criteria for consideration in the selection of next content. CAE system 201 may also detect a similar but different property in the current selection criteria, and may remove that property to prevent conflicting criteria.

In some embodiments, defining (at 418) the modified criteria may include expanding the criteria to account for new properties of the last selected content, and using that new criteria in selecting subsequent content. In this manner, CAE system 201 may be able to provide new and engaging content to a user that is still relevant to interests of the user and/or site objectives. The modified criteria may change how CAE system 201 selects subsequent content for the site to ensure that the site does not provide uniform content that is selected using the same criteria.

Process 400 may include selecting (at 420) custom content for a next customizable element of the requested site based on the modified criteria. For instance, the first criteria may specify that the requesting user has a preference for formalwear. The site may be populated with different outfits of formalwear when statically using the first criteria to select all content for the site. However, when modifying the criteria based on properties of earlier selected content, CAE system 201 may populate the site with a first outfit that is classified as formalwear, and second content for a second outfit, that is adjacent to the first outfit, may be selected based on the modified criteria to include a different casual styling of one item from the first outfit. In other words, the first outfit may include four different articles of clothing that are each classified as formalwear. The second outfit may include one article of clothing from the first outfit and three other articles of clothing that are classified as casualwear. In some embodiments, the different outfits may be stored with different identifying properties. In some other embodiments, the different outfits may be dynamically generated by grouping different articles of clothing that satisfy the current set of modified criteria.

Process 400 may include determining (at 422) if the requested site has additional customizable elements that have yet to be populated with custom content. For instance, CAE system 201 may scan the site template for entries that correspond to elements without selected content.

In response to determining (at 422—Yes) a next customizable element that has yet to be populated with custom content, process 400 may determine (at 416) properties of the last selected content, define (at 418) modified criteria based on the determined (at 416) properties, and may select (at 420) custom content for the next customizable element. In response to determining (at 422—No) that all customizable elements of the site have received custom content, process 400 may include populating (at 424) the site with the selected content. In particular, CAE system 201 may integrate the selected content into the site where the corresponding customizable elements are defined. Process 400 may include providing (at 426) the site with the custom content over a network to the requesting UE for presentation thereon.

In some embodiments, CAE system 201 may use the modified criteria to generate, rather than select, custom content for inclusion at different customizable elements in a requested site. The dynamically generated custom content may produce more combinations and/or different presentations of the available content.

Figure 5:
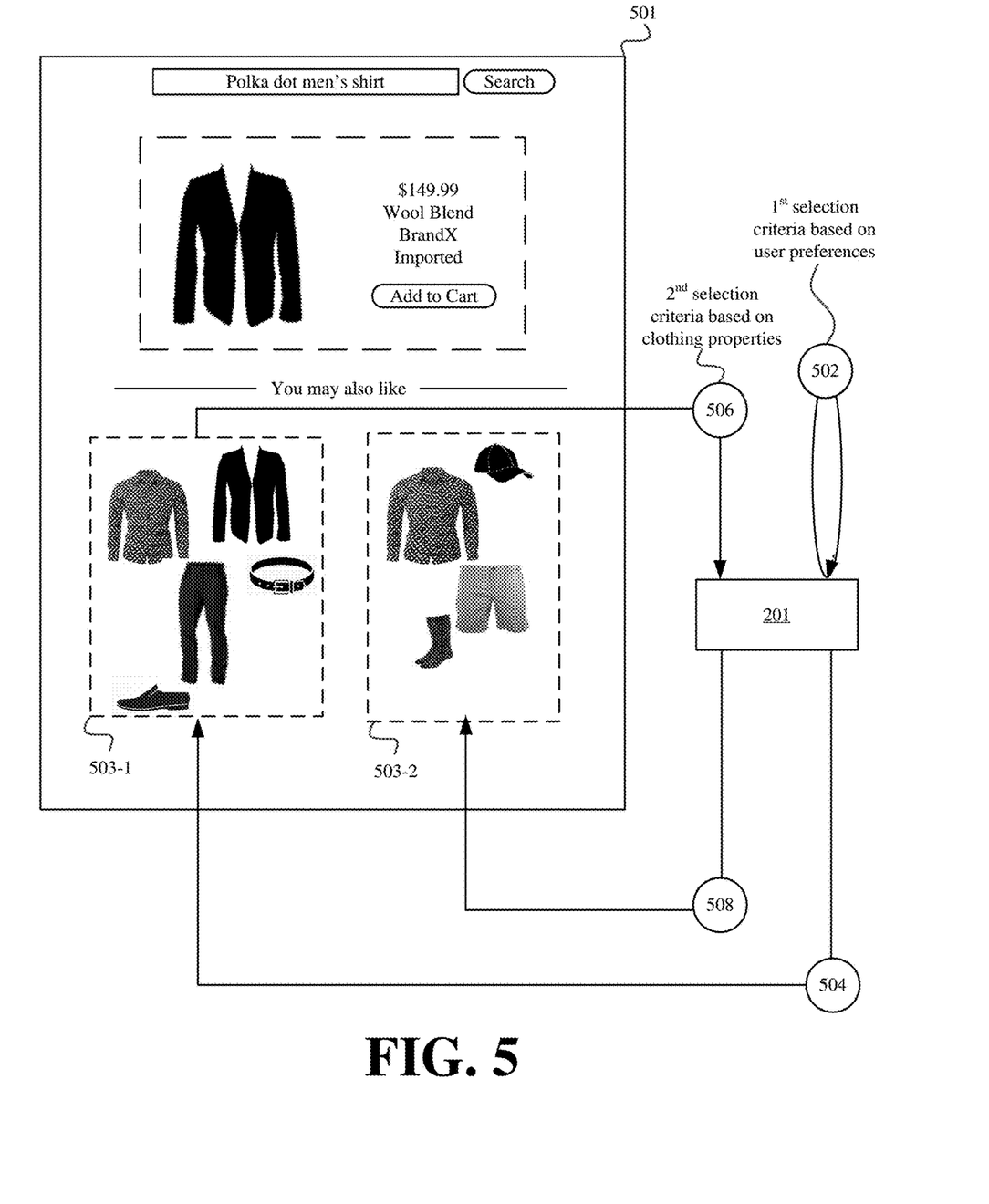
FIG. 5 illustrates an example for dynamically generating different content for a site based on changing content adjacency criteria in accordance with some embodiments presented herein.

FIG. 5 illustrates an example for dynamically generating different content for a site based on changing content adjacency criteria in accordance with some embodiments presented herein. As shown in FIG. 5, site 501 may include static content and/or content that is provided in response to user input. For instance, the user may search for or select a particular article of clothing, and site 501 may present the static content and/or information about the particular article of clothing. Additionally, site 501 may include a set of customizable elements 503-1 and 503-2 for a gallery that includes custom content for styling the particular article of clothing based on the evolving criteria of CAE system 201.

CAE system 201 may define (at 502) first criteria based on tracked user preferences. For instance, the first criteria may specify that the user prefers or has previously purchased formalwear that is within a particular price range and that includes certain patterns, brands, and/or coloring. CAE system 201 may dynamically generate (at 504) a first outfit according to the first criteria, and may populate first customizable element 503-1 with the first outfit. The first outfit may include a styling of the particular article of clothing (e.g., a jacket) with other articles of clothing that include a shirt, pants, belt, and shoes, and with each of the other articles of clothing matching the user's preferences (e.g., the first criteria).

Rather than use the same first criteria to generate a similar looking outfit to present next to the first outfit, CAE system 201 may determine (at 506) properties of the other articles of clothing that were included with the particular article of clothing in the first outfit or first content generated by CAE system 201, and may define (at 506) different second criteria that modifies the first criteria to incorporate aspects of the determined properties from the first outfit while preserving content adjacency between the first outfit and a custom generated second outfit that is presented next to the first outfit. In other words, the second criteria may retain the particular cost, preferred colors, and/or preferred brands from the first criteria, and may add or replace an existing styling criterion of the first criteria with a new styling criterion that is determined from a property of the other articles of clothing that were added in order to generate the first content.

CAE system 201 may generate (at 508) the second outfit according to the second criteria that is derived from one or more properties of the various clothing items that CAE system 201 groups together in generating the first content. CAE system 201 may generate (at 508) the second outfit by selecting different articles of clothing that satisfy the second criteria. For instance, CAE system 201 may determine that the dress shirt from the first outfit includes a property specifying a different styling of that dress shirt (e.g., a formal and casual styling). Accordingly, CAE system 201 may generate (at 508) the second outfit to include other articles of clothing that complement the styling property of the dress shirt in the first content already customed generated by CAE system 201.

As shown in FIG. 5, the first outfit may include items that satisfy each of the user preferences for a particular cost, a particular style, preferred colors, preferred brands, and/or other preferences, and the second outfit may have content adjacency with the first outfit by including items that satisfy many of the same user preferences and that satisfy at least one new criterion that is based on a new property detected from the custom generated first outfit. In other words, the second outfit may include items that still satisfy the user preference for cost, coloring, and brands, and the included items may be based on the different styling property of the shirt that CAE system 201 adds to the custom generated first outfit. Accordingly, the different criteria used to generate the second outfit may provide site 501 with some variety and may provide the user exposure to new content that would otherwise remain hidden when customizing the content with the same static criteria.

As noted above, the outfits matching the evolving criteria may be generated dynamically or selected from a set of previously generated outfits. For instance, CAE system 201 may generate a plurality of different outfits or may have access to a datastore with the plurality of different outfits. Each outfit may be tagged with different properties that identify the commonality in the different items of clothing that make up that outfit. For instance, each outfit may be tagged with a style, seasonality, occasion, price, brand, color scheme, and/or other properties. Each outfit may also be tagged with unique attributes from individual items of the outfit. Accordingly, CAE system 201 may select a first outfit from the plurality of outfits based on a first set of selection criteria, insert the first outfit in place of a first customizable element of a site, modify the first set of selection criteria based on properties of the selected first outfit, select a second outfit from the plurality of outfits based on modified selection criteria that is different than the first set of selection criteria and that nevertheless preserves content adjacency with the first output, insert the second outfit in place of a second customizable element of the site, and continue selecting different outfits for the site using the continually evolving selection criteria.

Figure 6:
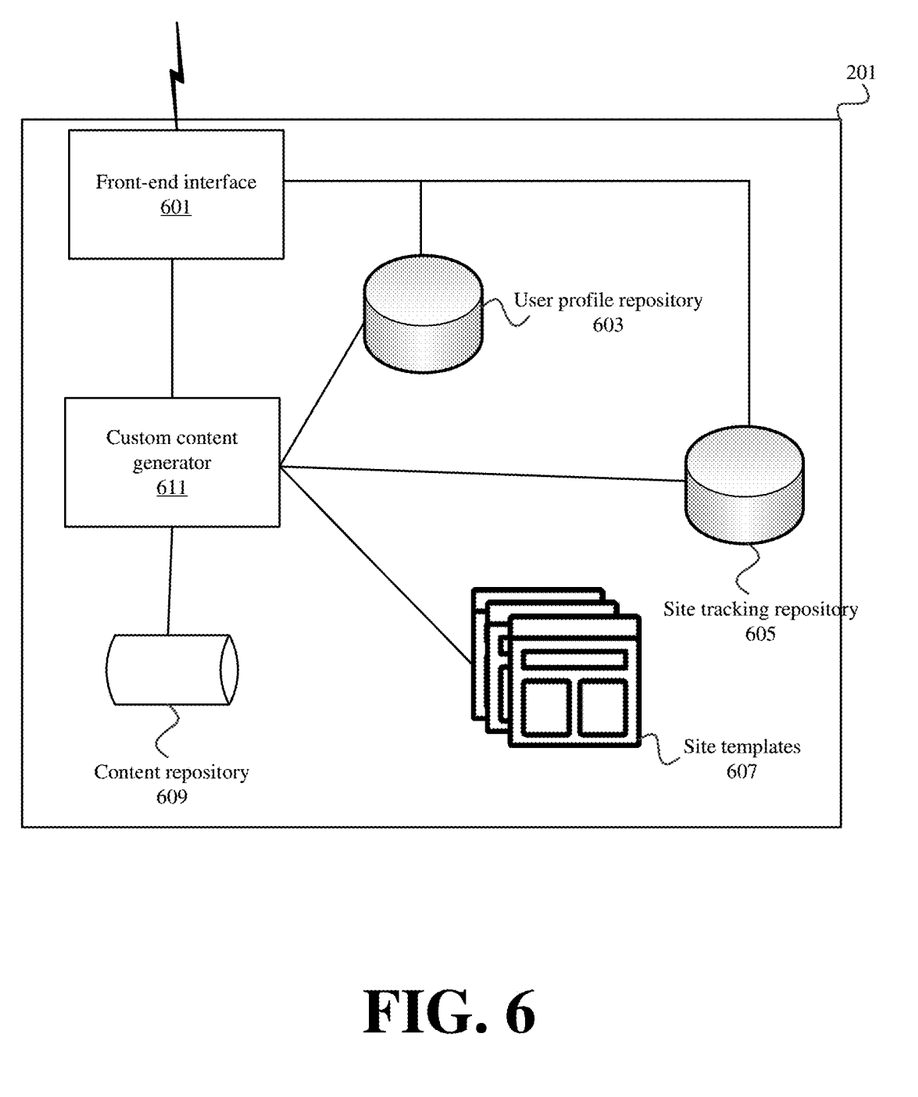
FIG. 6 illustrates an example architecture for a system in accordance with some embodiments.

FIG. 6 illustrates an example architecture for CAE system 201 in accordance with some embodiments. As shown in FIG. 6, CAE system 201 may include front-end interface 601, user profile repository 603, site tracking repository 605, site templates 607, content repository 609, and custom content generator 611.

Front-end interface 601 may include a host, device, portal, and/or other node for receiving user requests to access one or more sites. Front-end interface 601 may be hosted and/or operated by an online merchant or other third-party whose sites are dynamically populated with custom content by CAE system 201. Front-end interface 601 may forward requests for a site with customizable elements to custom content generator 611, custom content generator 611 may return the site that is populated with different custom content to front-end interface 601, and front-end interface 601 may present or provide the site to the requesting UE via a wired or wireless data network.

User profile repository 603 may store information that CAE system 201 and/or front-end interface 601 tracks for different users. The information may include purchase history, content preferences, content engagement, location, device signatures, and/or other user engagement, interactions, and/or user-specific information.

Site tracking repository 605 may store collective engagement information based on prior engagements that a plurality of different users have with a site. The collective information may identify the most popular content, the most engaged with content, the newest content, and/or other collective engagement, interactions, and/or site-specific information.

Site templates 607 may include the code, framework, and/or definition of different sites that may be populated with customizable content. Each template 607 may identify a set of customizable elements for a site. Each customizable element may set the location and size for content that is to be presented for that customizable element. Each customizable element may also include parameters that limit the type of content that may be presented for that customizable element. For instance, a first customizable element may be used to present a customizable banner advertisement of a particular size, and a second customizable element may be used to present clothing items of a merchant. Each customizable element may correspond to an entry in the template that may be modified by custom content generator 611 to include a link to selected content and/or the data for selected content.

Content repository 609 may store the plurality of content that is available for populating the customizable elements in each template 607. Content repository 609 may include images, text, multimedia content, applications, services, and/or other data that may be included in the final presentation of the site. Content repository 609 may correspond to a data store of an online merchant, and may include available inventory of the online merchant. In some embodiments, CAE system 201 may pull content from the data store of an online merchant or other third party in order to populate content repository 609.

Each content item in content repository 609 may include metadata with tags that describe various properties of the content. The properties may provide information about the price, object, color, sizes, quantity, brand, style, occasion, purchase history, pairing (e.g., first object typically purchased with a second object), and/or other descriptive data about the content or the object represented by the content.

Custom content generator 611 may be a distributed or centralized device that may be hosted on-premises of a host or may be remote to the host. Custom content generator 611 may be communicably coupled to each of front-end interface 601, user profile repository 603, site tracking repository 605, site templates 607, and content repository 609. Custom content generator 611 may use one or more processors to generate the evolving criteria and to populate the customizable elements of each site template 607 with custom content based on the evolving criteria.

Figure 7:
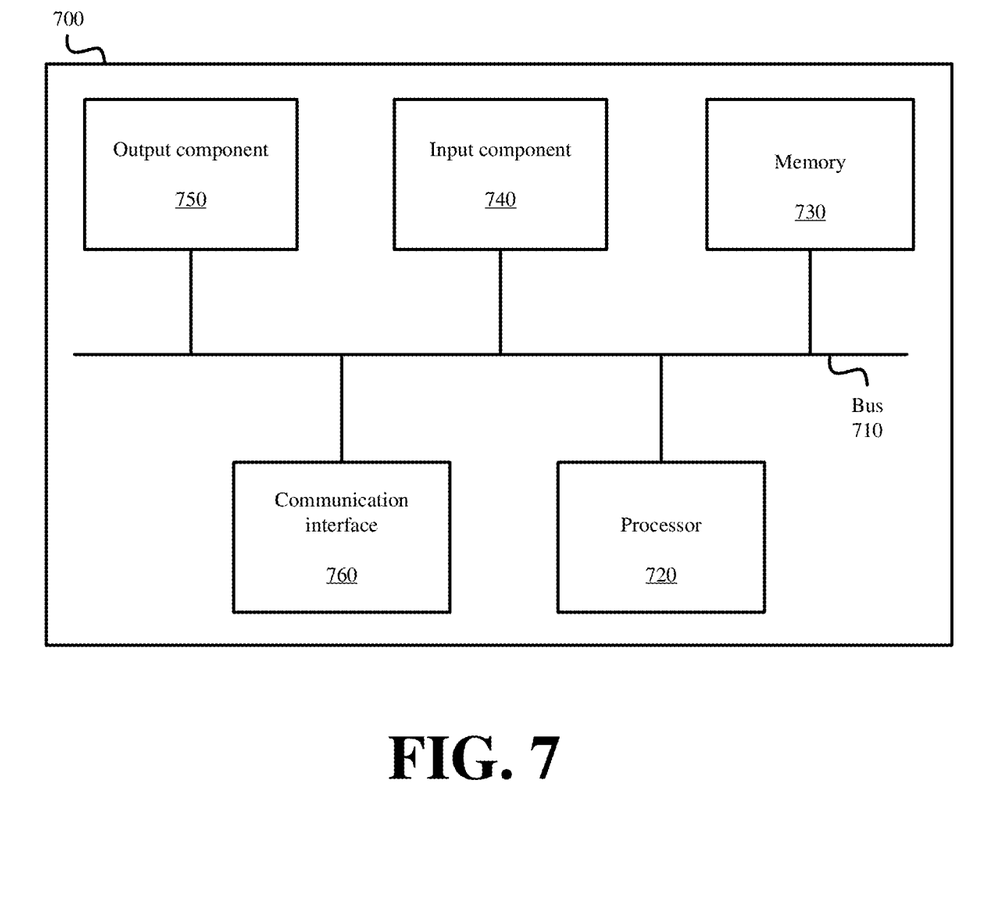
FIG. 7 illustrates example components of one or more devices, according to one or more embodiments described herein.

FIG. 7 is a diagram of example components of device 700. Device 700 may be used to implement one or more of the devices or systems described above (e.g., CAE system 201, front-end interface 601, custom content generator 611, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving a request for a site from a user;
receiving first selection criteria with which to dynamically customize a plurality of customizable elements of a presentation for the site, wherein the first selection criteria is based on one or more user preferences stored in a profile associated with the user, user input issued with the request, or content priority that is specified for the site;
selecting a first content for a first customizable element of the presentation having a first plurality of properties that match one or more properties corresponding to the first selection criteria;
determining at least a first property from the first plurality of properties that differs from and is not present in the one or more properties corresponding to the first selection criteria and that increases variety of a second customizable element relative to the first content selected for the first customizable element presented adjacent to the second customizable element in the presentation in response to analyzing the first plurality of properties against the one or more properties corresponding to the first selection criteria;
dynamically modifying the first selection criteria after selecting the first content for the first customizable element and before selecting content for the second customizable element, wherein dynamically modifying the first selection criteria comprises defining second selection criteria based on a subset of the one or more properties of the first selection criteria and the at least first property of the first content that differs from and is not present in the one or more properties corresponding to the first selection criteria;
selecting a second content with a second plurality of properties for the second customizable element of the presentation based on the second plurality of properties satisfying the second selection criteria by comprising the first property of the first content, the subset of the one or more properties, and one or more other properties that do not satisfy the first selection criteria;
determining at least a second property from the second plurality of properties of the second content that differs from the first plurality of properties of the first content, the one or more properties corresponding to the first selection criteria, and properties of the second selection criteria used in selecting the second content and that increases variety of a third customizable element relative to the first content selected for the first customizable element and the second content selected for the second customizable element presented adjacent to the third customizable element in the presentation in response to analyzing the second plurality of properties against the first plurality of properties and the one or more properties corresponding to the first selection criteria;

dynamically modifying the second selection criteria after selecting the second content for the second customizable element and before selecting content for the third customizable element, wherein dynamically modifying the second selection criteria comprises defining third selection criteria to include the second property that is not part of the first selection criteria or the second selection criteria;

selecting a third content with a third plurality of properties for the third customizable element of the presentation based on the third plurality of properties satisfying the third selection criteria by comprising the second property of the second content and one or more other properties that do not satisfy the first selection criteria used in selecting the first content or the second selection criteria used in selecting the second content; and providing the presentation comprising the first content, the second content, and the third content in response to the request.

2. The method of claim 1 further comprising:

receiving a user query with the request that specifies the one or more properties associated with the first selection criteria that differ from the first property and the second property; and wherein selecting the first content for the first customizable element of the presentation comprises selecting the first content based on commonality between the first plurality of properties of the first content and the one or more properties from the user query.

3. The method of claim 2, wherein selecting the first content further comprises querying a repository storing a plurality of different content using the user query;

wherein selecting the second content comprises issuing a first modified query with the second selection criteria that is different than the user query and that includes the first property of the first content that is not specified as part of the user query; and wherein selecting the third content comprises issuing a second modified query with the third selection criteria that is different than the user query and the first modified query and that includes the second property of the second content that is not specified as part of the user query or the first modified query.

4. The method of claim 1, wherein selecting the second content comprises:

determining a first set of content having a first set of properties in common with the first property and that satisfy the second selection criteria without satisfying the first selection criteria;

selecting the second content from the first set of content for the second customizable element in response to a first request for the site comprising the presentation;

selecting a fourth content from the first set of content for the second customizable element in response to a second request for the site;

selecting a fifth content for the third customizable element in response to the second request based on a third property of the fourth content that differs from properties of the first content, the second content, and the third content of the presentation created in response to the first request; and providing the presentation comprising the first content, the fourth content, and the fifth content in response to the second request.

5. The method of claim 1 further comprising:

defining the second selection criteria used in selecting the second content to include at least one property specified as part of a user query, that specifies the one or more properties associated with the first selection criteria, and the first property of the first content that is not specified as part of the user query; and defining the third selection criteria used in selecting the third content to include the at least one property specified as part of the user query and the second property of the second content that is not specified as part of the user query or the second selection criteria, wherein the second selection criteria is different than the first selection criteria and the user query.

6. The method of claim 1, wherein determining at least the second property of the second content comprises:

analyzing text or visual characteristics of the second content; and identifying text or visual characteristics of the second content that differ from the first property of the first content and text or visual characteristics of the first content.

7. The method of claim 1 further comprising:

receiving the request from a user device;

retrieving a template for the presentation that defines a positioning for the plurality of customizable elements; and generating the presentation with the first content at a first position defined for the first customizable element in the template, the second content at a second position defined for the second customizable element in the template, and the third content at a third position defined for the third customizable element in the template.

8. The method of claim 7, wherein the template comprises a HyperText Markup Language ("HTML") base page, Cascading Style Sheets ("CSS"), or code that specifies a layout for the plurality of customizable elements and that excludes content for each customizable element of the plurality of customizable elements.

9. The method of claim 1, wherein determining at least the second property comprises:

comparing visual properties of the second content against visual properties of the first content, wherein the visual properties of the first content and of the second content correspond to one or more of coloring, styling, or patterning of items represented in the first content and the second content; and identifying the second property as a visual property of the second content that is not found in the first content.

10. The method of claim 1, wherein determining at least the second property comprises:

comparing textual identifiers of the second content against textual identifiers of the first content, wherein the textual identifiers of the first content and of the second content correspond to keywords that describe characteristics of items represented in the first content and the second content; and
identifying the second property as a textual identifier of the second content that is not found in the first content.

11. The method of claim 1,
wherein selecting the first content comprises determining that the first content satisfies an engagement threshold or user preference by a threshold;
wherein selecting the second content for the second customizable element comprises identifying the second content that matches the first property of the first content over other content that satisfies the engagement threshold or the user preference by the threshold and that does not comprise the first property; and
wherein selecting the third content for the third customizable element comprises identifying the third content that matches the second property of the second content over other content that satisfies the engagement threshold or the user preference by the threshold and that does not comprise the second property, or other content that comprises the first property and that does not comprise the second property.

12. The method of claim 1 further comprising:
modifying selection criteria used to select content for each customizable element after each selection, wherein said modifying comprises adding new criterion based on a property of a last selected content that is not found in earlier content selections.

13. The method of claim 12, wherein modifying the selection criteria further comprises:
removing criterion from the selection criteria that conflicts with the new criterion added as a result of the property of a last selected content that is not found in earlier content selections.

14. The method of claim 1, wherein the presentation is a first presentation, the method further comprising:
generating a second presentation in response to determining at least a third property of the second content that differs from properties of the first content and the second property of the second content, and selecting a fourth content for the third customizable element of the second presentation based on the third property; and
providing the second presentation comprising the first content, the second content, and the fourth content in response to a second user request.

15. A device comprising:
one or more processors configured to:
receive a request for a site from a user;
receive first selection criteria with which to dynamically customize a plurality of customizable elements of a presentation for the site, wherein the first selection criteria is based on one or more user preferences stored in a profile associated with the user or content priority that is specified for the site;
select a first content for a first customizable element of the presentation having a first plurality of properties that match one or more properties corresponding to the first selection criteria;
determine at least a first property from the first plurality of properties that differs from and is not present in the one or more properties corresponding to the first selection criteria and that increases variety of a second customizable element relative to the first content selected for the first customizable element presented adjacent to the second customizable element in the presentation in response to analyzing the first plurality of properties against the one or more properties corresponding to the first selection criteria;
dynamically modify the first selection criteria after selecting the first content for the first customizable element and before selecting content for the second customizable element, wherein dynamically modifying the first selection criteria comprises defining second selection criteria based on a subset of the one or more properties of the first selection criteria and the at least first property of the first content that differs from and is not present in the one or more properties corresponding to the first selection criteria;
select a second content with a second plurality of properties for the second customizable element of the presentation based on the second plurality of properties satisfying the second selection criteria by comprising the first property of the first content, the subset of the one or more properties, and one or more other properties that do not satisfy the first selection criteria;
determine at least a second property from the second plurality of properties of the second content that differs from the first plurality of properties of the first content, the one or more properties corresponding to the first selection criteria, and properties of the second selection criteria used in selecting the second content and that increases variety of a third customizable element relative to the first content selected for the first customizable element and the second content selected for the second customizable element presented adjacent to the third customizable element in the presentation in response to analyzing the second plurality of properties against the first plurality of properties and the one or more properties corresponding to the first selection criteria;
dynamically modify the second selection criteria after selecting the second content for the second customizable element and before selecting content for the third customizable element, wherein dynamically modifying the second selection criteria comprises defining third selection criteria to include the second property that is not part of the first selection criteria or the second selection criteria;
select a third content with a third plurality of properties for the third customizable element of the presentation based on the third plurality of properties satisfying the third selection criteria by comprising the second property of the second content and one or more other properties that do not satisfy the first selection criteria used in selecting the first content or the second selection criteria used in selecting the second content; and
provide the presentation comprising the first content, the second content, and the third content in response to the request.

16. The device of claim 15, wherein the one or more processors are further configured to:
receive a user query with the request that specifies the one or more properties associated with the first selection criteria that differ from the first property and the second property and
wherein selecting the first content for the first customizable element of the presentation comprises selecting the first content based on commonality between the first plurality of properties of the first content and the one or more properties from the user query.

17. The device of claim 16,
wherein selecting the first content further comprises querying query a repository storing a plurality of different content using the user query;
wherein selecting the second content comprises issuing with the second selection criteria that is different than the user query and that includes the first property of the first content that is not specified as part of the user query; and
wherein selecting the third content comprises issuing a second modified query with the third selection criteria that is different than the user query and the first modified query and that includes the second property of the second content that is not specified as part of the user query or the first modified query.

18. A non-transitory computer-readable medium, storing a plurality of processor-executable instructions to:
receive a request for a site from a user;
receive first selection criteria with which to dynamically customize a plurality of customizable elements of a presentation for the site, wherein the first selection criteria is based on one or more user preferences stored in a profile associated with the user or content priority that is specified for the site;
select a first content for a first customizable element of the presentation having a first plurality of properties that match one or more properties corresponding to the first selection criteria;
determine at least a first property from the first plurality of properties that differs from and is not present in the one or more properties corresponding to the first selection criteria and that increases variety of a second customizable element relative to the first content selected for the first customizable element presented adjacent to the second customizable element in the presentation in response to analyzing the first plurality of properties against the one or more properties corresponding to the first selection criteria;
dynamically modify the first selection criteria after selecting the first content for the first customizable element and before selecting content for the second customizable element, wherein dynamically modifying the first selection criteria comprises defining second selection criteria based on a subset of the one or more properties of the first selection criteria and the at least first property of the first content that differs from and is not present in the one or more properties corresponding to the first selection criteria;
select a second content with a second plurality of properties for the second customizable element of the presentation based on the second plurality of properties satisfying the second selection criteria by comprising the first property of the first content, the subset of the one or more properties, and one or more other properties that do not satisfy the first selection criteria;
determine at least a second property from the second plurality of properties of the second content that differs from the first plurality of properties of the first content, the one or more properties corresponding to the first selection criteria, and properties of the second selection criteria used in selecting the second content and that increases variety of a third customizable element relative to the first content selected for the first customizable element and the second content selected for the second customizable element presented adjacent to the third customizable element in the presentation in response to analyzing the second plurality of properties against the first plurality of properties and the one or more properties corresponding to the first selection criteria;
dynamically modify the second selection criteria after selecting the second content for the second customizable element and before selecting content for the third customizable element, wherein dynamically modifying the second selection criteria comprises defining third selection criteria to include the second property that is not part of the first selection criteria or the second selection criteria;
select a third content with a third plurality of properties for the third customizable element of the presentation based on the third plurality of properties satisfying the third selection criteria by comprising the second property of the second content and one or more other properties that do not satisfy the first selection criteria used in selecting the first content or the second selection criteria used in selecting the second content; and
provide the presentation comprising the first content, the second content, and the third content in response to the request.

* * * * *